United States Patent [19]

Brown

[11] Patent Number: 4,599,886

[45] Date of Patent: Jul. 15, 1986

[54] MANUFACTURE OF METAL CONTAINERS

[75] Inventor: Eric D. Brown, Northants, England

[73] Assignee: Sodastream Limited, Peterborough, England

[21] Appl. No.: 659,305

[22] Filed: Oct. 10, 1984

[30] Foreign Application Priority Data

Oct. 10, 1983 [GB] United Kingdom ............... 8327016

[51] Int. Cl.⁴ .............................................. B21D 22/00
[52] U.S. Cl. ........................................ 72/349; 72/348
[58] Field of Search .................................. 72/347–349; 51/5 A, 281 R, 324

[56] References Cited

U.S. PATENT DOCUMENTS 3,855,862  12/1974  Moller ................................. 72/349
4,175,415  11/1979  Knorring ............................ 51/5 A
4,493,201   1/1985  Schmidt .............................. 72/341

Primary Examiner—Leon Gilden
Attorney, Agent, or Firm—Watson, Cole, Grindle & Watson

[57] ABSTRACT

A method of manufacturing a high pressure gas cylinder by deep drawing and ironing a blank of high strength steel, the periphery of the blank being ground prior to cupping.

10 Claims, 5 Drawing Figures

MANUFACTURE OF METAL CONTAINERS

BACKGROUND OF THE INVENTION

This invention relates to the manufacture of containers made of metal. In particular, the invention concerns a method of making metal containers using a deep drawing and ironing process.

It is well known to manufacture metal containers by deep drawing and ironing a metal blank. According to the known methods, a flat circular blank is stamped from sheet material by means of a blanking press. The blank, after application of a suitable lubricating composition, is then formed into a cup-shape by pushing the blank through a series of die rings by means of a punch. The cups produced by this first drawing and ironing step (otherwise known as "cupping") are work hardened and therefore subjected to an annealing treatment to render the material suitable for further forming before a second drawing and ironing step is performed on the cups by punching them through a second set of ring dies to reshape the cups to the required diameter and wall thickness.

The known method has proved highly successful for some metals such as aluminium and mild steel which have the required ductility, and containers made in this way are satisfactory for many applications, such as cylinders for containing gases at relatively low pressures. In other cases, however, and in particular in the case of high pressure gas cylinders, e.g. for carbon dioxide, it has been the practice hitherto to manufacture the containers from tube stock since safety requirements or other considerations demand that higher strength material, i.e. high strength steel, should be used, otherwise a much greater wall thickness is necessary to achieve the strength needed. The use of tube stock has the drawback that an end of the tube must be closed off. Defects can occur at the closed end and result in leakage of gas from the containers. This method is also labour intensive and costly in comparison with the deep drawing and ironing techniques as mentioned above. Attempts to extend the known deep drawing and ironing method to blanks of high strength steel proved unsuccessful. During the cupping process there is a stress concentration at the blank edge which results in the cups being flawed by cracks and fractures extending downwardly from the cup rims. Cups with such flaws are useless and are incapable of producing satisfactory containers. While lower strength steels could be used for high pressure gas cylinder manufacture, additional material required in order to obtain the required strength would negate the gain in economy from employing a deep drawing and ironing process.

SUMMARY OF THE INVENTION

The present invention aims at a solution to the above problems and in accordance with the invention there is provided a method of making a container by deep drawing and ironing a metal blank, wherein the blank is of high strength steel and a surface layer of material is removed from the peripheral edge of the blank, whereby surface irregularities are substantially eliminated, before forming the blank into a cup-shape.

Most conveniently, the surface layer is removed from the periphery of the blank by grinding, although other methods, such as turning are also possible.

It has been found that grinding the outer diameter of the blanks provides an effective and efficient way of avoiding any cracks or fractures in the cupped blanks and has enabled containers of high strength steel to be successfully made by deep drawing and ironing, which has not been possible prior to the present invention.

Grinding the blank edge at least to a surface smoothness of 4.0 $\mu$m CLA (centre line average) provides satisfactory results.

It is preferable for at least 0.3 mm of material, and more ideally at least 0.5 mm of material to be removed from the blank periphery.

The manufacturing process of the invention is suitable for high strength steels having a carbon content greater than 0.3% by wt, or even greater than 0.35% by wt, and having a sulphur content which is low and preferably not greater than 0.005% by wt. Such steels are significantly stronger than mild steels which have been used previously in making containers by drawing and ironing and which typically have a carbon content of 0.1–0.2% by wt.

A low sulphur content assists by improving the drawability of the metal. In this respect it is preferable than the sulphur content be less than 0.004% by wt, or even less than 0.001% by wt. However, as the sulphur content is reduced, the cost of the material increases. For reasons of economy, therefore, steels with a slightly higher sulphur content may be used.

By means of the method of the invention it becomes possible to manufacture high pressure gas cylinders from high strength steel by deep drawing and ironing, which alternative has not been available in the past. When a blank is pressed out of sheet material, the material at the edge of the disc may become work hardened and surface irregularities are produced at the periphery by the shearing action. The success achieved by the method according to the invention is due to the removal of a surface layer from the periphery of the blank. If attempt is made to form a stamped out blank of high strength steel into cup shape, without first improving the edge surface condition, the internal stresses generated at the edge, which stresses are intensified by the presence of work hardened material, tend to gather together at any depression or notch at the edge surface and, unable to withstand the concentrated stresses, the material fractures at the discontinuity. Removing the surface layer at the edge of the blank in accordance with the invention will eliminate any work hardened material to help keep down stress levels, and removes surface irregularities so that the stresses are more evenly distributed and their concentration at any one point is avoided.

A more complete understanding of the invention will be had from the following detailed description of a method of producing gas cylinders, reference being made to the accompanying drawings.

DETAILED DESCRIPTION OF THE INVENTION

The gas cylinder production method embodying the invention involves a series of steps which will be described in sequence.

Blank preparation

Figure 1:
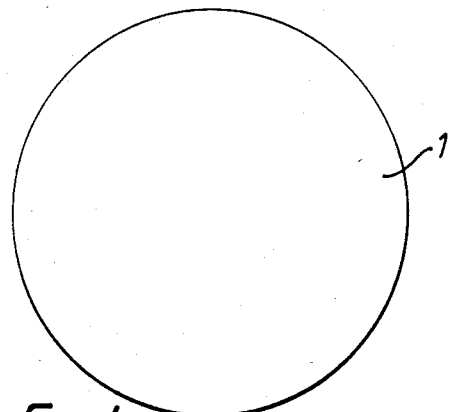
FIG. 1 is a plan view of a metal blank.
Figure 2:
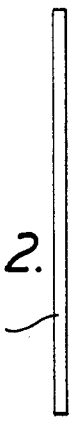
FIG. 2 is a side view of the blank.

Circular blanks 1 depicted in FIGS. 1 and 2 are stamped out of a steel strip by a punch and die set, the strip being supplied in coiled form and being flattened before being fed to the blanking press.

Satisfactory results have been achieved with high strength carbon-manganese steel containing carbon around 0.35% by wt, manganese around 1.4% by wt, and sulphur around 0.004% by wt.

In one particular example which has been successful, the steel includes the stated following elements in the percentages:

| | | |
|---|---|---|
| C | 0.32–0.37 | (±0.03) |
| Si | 0.1–0.35 | |
| Mn | 1.30–1.50 | (±0.08) |
| P | 0.015 | (0.025 max) |
| S | 0.005 | |

Residual elements may be present with an aggregate amount not more than about 0.4%.

Figure 3:
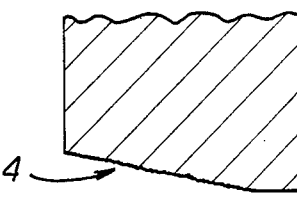
FIG. 3 is a detail view showing the edge profile of the blank on an enlarged scale.

Due to the shearing action of the blanking press tools, the blanks do not have good clean edges. Instead, as illustrated in FIG. 3, depressions and other surface discontinuities 4 are left at the sheared peripheral edge.

In accordance with the preferred embodiment of the invention, the outer edges of the blanks are surface ground to eliminate surface defects from the periphery.

It has been found advisable for at least 0.3 mm of material to be ground away, and preferably 0.75 mm is actually removed. The surface finish obtained at the edge is 4.0 $\mu$m CLA, although it could be ground to, say, 1.6 $\mu$m CLA if found expedient.

As a final step in the blank preparation, the metal surface is provided with a lubricating composition, e.g. zinc phosphate and zinc stearate, in a manner itself known.

Cupping

Figure 4:
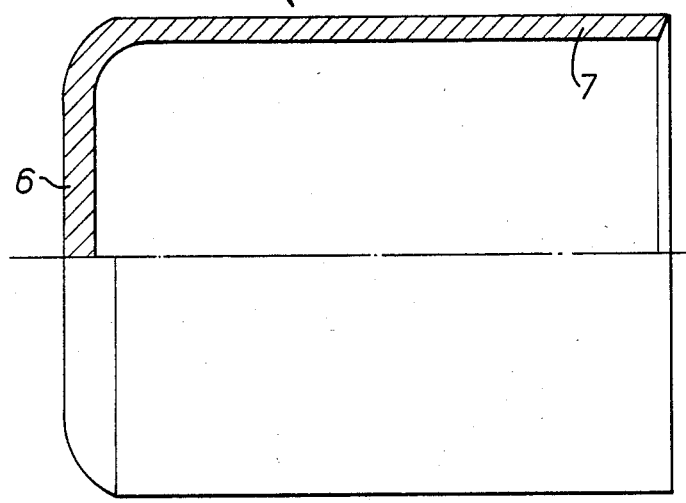
FIG. 4 is a part sectioned view of a cup formed from a blank.

The prepared blanks are supplied to a forming machine for each blank to be drawn and ironed into the shape of a cup 5, as shown in FIG. 4. A punch moves the blank through a series, e.g. 3 annular dies form a cup with base 6 and cylindrical side wall 7. During this operation high internal stresses are generated in the metal, especially at the blank edge, but the smooth edge surface free of work hardened material obtained by means of the preceding grinding of the blank ensures that no fractures will occur at the cup rim, which is essential for satisfactory production results.

During their formation the cups are work hardened and they must be subjected to an annealing process followed by a further application of lubricant before they are ready for a second drawing and ironing stage. This treatment of the cups is well known in itself.

Re-Drawn and Iron

Figure 5:
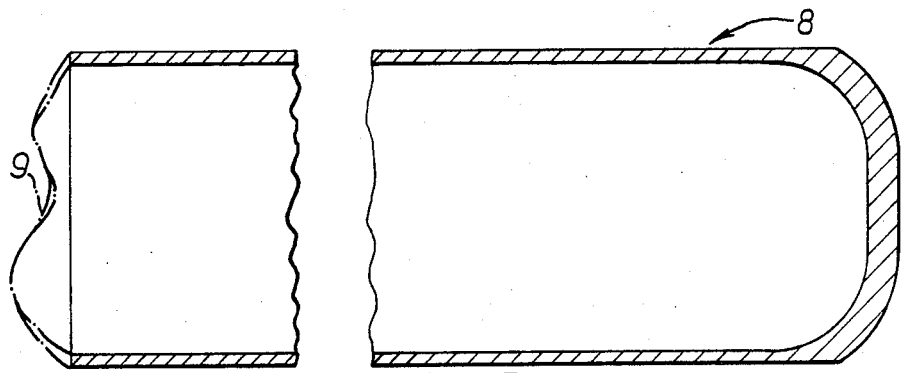
FIG. 5 is an axial section through a cylinder shell produced from the cup of FIG. 4.

The cups are redrawn to the final cylinder diameter with the walls ironed to the final thickness by moving the cups through a second series of annular dies. The cylindrical shell 8 obtained is as shown in FIG. 5, including the irregular edge 9 at the open end which is illustrated in broken line. This edge portion is removed by trimming the cylindrical shell to required length.

Necking and Normalising

The open end of the trimmed cylinder is heated and "forged" by moving dies to form a neck on the cylinder.

Finally, it is necessary for the cylinder to undergo a normalising or stress relief treatment to achieve a constant tensile strength and increase hardness. Although safety factors normally preclude any risk of a gas cylinder bursting, for reasons of safety it is desirable that a cylinder should burst by a split occurring in the cylindrical wall rather than by a sudden explosion producing flying metal fragments. The normalising treatment effected by heating and controlled cooling ensures that the required material strength is obtained.

By the above-described process it has been found possible to manufacture high pressure gas cylinders of high strength steel by drawing and ironing a flat blank, whereas previous attempts to reach this result have been unsuccessful in spite of the fact that many stages in the method are well known in themselves.

While grinding is the currently preferred method for obtaining the required surface finish at the edges of the blanks, satisfactory blanks can also be prepared by turning.

I claim:

1. A method of making a container which comprises the steps of (1) providing a metal blank made of high strength steel, said metal blank having a peripheral edge with surface irregularities, (2) removing a surface layer from the peripheral edge of said metal blank so as to remove said surface irregularities, and (3) deep drawing and ironing said metal blank obtained in step (2) to form a cup-shape.

2. A high pressure gas cylinder which is made by a method which includes the steps of (1) providing a metal blank made of high strength steel, said metal blank having a peripheral edge with surface irregularities, (2) removing a surface layer from the peripheral edge of said metal blank so as to remove said surface irregularities, and (3) deep drawing and ironing said metal blank obtained in step (2) to form a cup-shape.

3. A method according to claim 1, wherein in step (2) the surface layer is removed by grinding.

4. A method according to claim 3, wherein the peripheral edges of said metal blank is ground to at least a smoothness of 4.0 $\mu$m CLA.

5. A method according to claim 1, wherein the thickness of the surface layer removed from said metal blank peripheral edge is at least 0.3 mm.

6. A method according to claim 5, wherein the thickness of the surface layer removed from the peripheral edge of said metal blank is within the range of about 0.5 mm to about 0.75 mm.

7. A method according to claim 1, wherein said metal blank is made of high strength steel which has a carbon content greater than 0.3% by wt.

8. A method according to claim 1, wherein said metal blank is made of high strength steel which has a sulphur content not greater than about 0.005% by wt.

9. A method according to claim 8, wherein said sulphur content is in the range of from about 0.001 to about 0.004% by wt.

10. A method according to claim 1, wherein said metal blank is made of carbon-manganese steel containing about 0.35% by wt carbon, about 1.4% by wt manganese, and about 0.004% by wt sulphur.

* * * * *